(12) United States Patent
Daouk (10) Patent No.: US 11,124,302 B2
(45) Date of Patent: Sep. 21, 2021

(54) PROTECTION DEVICE WITH MODULABLE DIMENSIONS FOR AN EQUIPMENT ANCHORING RAIL

(71) Applicant: Antar Daouk, Paris (FR)

(72) Inventor: Antar Daouk, Paris (FR)

(*) Notice: Subject to any disclaimer, the term of this patent is extended or adjusted under 35 U.S.C. 154(b) by 0 days.

(21) Appl. No.: 16/133,965

(22) Filed: Sep. 18, 2018

(65) Prior Publication Data
US 2019/0061956 A1 Feb. 28, 2019

Related U.S. Application Data

(63) Continuation of application No. 14/893,670, filed as application No. PCT/FR2014/000111 on May 21, 2014, now abandoned.

(51) Int. Cl.
| | | |
|---|---|---|
| *B64D 9/00* | (2006.01) | |
| *B64D 11/06* | (2006.01) | |
| *B60N 2/07* | (2006.01) | |

(52) U.S. Cl.
CPC ........ *B64D 11/0696* (2013.01); *B60N 2/0725* (2013.01); *B64D 9/00* (2013.01); *B64D 9/003* (2013.01)

(58) Field of Classification Search
CPC ...... B64D 11/0696; B64D 9/00; B64D 9/003; B64D 11/06; B64D 11/0639; B60N 2/0725; B64C 1/20

USPC ................. 410/104, 105; 244/118.6, 118.5; 297/463.1

See application file for complete search history.

(56) References Cited

U.S. PATENT DOCUMENTS

| | | | | |
|---|---|---|---|---|
| 4,927,201 A | * | 5/1990 | Froutzis | B60N 2/01508 248/503.1 |
| 4,936,527 A | * | 6/1990 | Gorges | B64D 11/0696 410/105 |
| 7,097,401 B2 | | 8/2006 | Haspel | |
| 2005/0247820 A1 | | 11/2005 | Feist et al. | |
| 2006/0097109 A1 | | 5/2006 | Laib et al. | |

OTHER PUBLICATIONS

International Search Report and Written Opinion for PCT/FR2014/000111.

* cited by examiner

*Primary Examiner* — Stephen T Gordon
(74) *Attorney, Agent, or Firm* — McClure, Qualey & Rodack, LLP (57) ABSTRACT

The invention relates to a device for protecting a detachable equipment anchoring rail having adjustable dimensions, which is lockable, tamper-proof, reusable and consists of elements which are interconnected in such a way as to be secured and deployable and to provide, whatever the level of deployment thereof, all of the functions for protecting the rail against any type of aggression via a locking system.

14 Claims, 7 Drawing Sheets

FIGURE 2

PROTECTION DEVICE WITH MODULABLE DIMENSIONS FOR AN EQUIPMENT ANCHORING RAIL

CROSS REFERENCE TO RELATED APPLICATIONS

This application is a Continuation of pending U.S. patent application Ser. No. 14/893,670, filed on Nov. 24, 2015 and entitled "Protection Device with Modulable Dimensions for an Equipment Anchoring Rail", which is a 371 of PCT/FR2014/000111, filed on May 21, 2014, and claims priority of FR Patent Application No. 1301185, filed on May 24, 2013, and claims priority of FR Patent Application No. 1400722, filed on Mar. 25, 2014, the entirety of which is incorporated by reference herein.

BACKGROUND

Technical Field

The present invention relates to a rail protection device of variable dimensions for a rail for anchoring equipment in transport means that may be an aircraft.

Description of the Related Art

In general, existing rail protection devices are made up of section member segments cut to the dimensions of predetermined intervals that are to be protected. Those devices are not variable and they become unusable in the event of a change in the length of the portion of rail that is to be covered. When modifying the space that is to be protected, it then becomes necessary to cut new devices to the appropriate length or to add or remove section member elements, thereby requiring a return to a workshop and degrading the effectiveness with which the rail protection function is performed, since adding and removing elements weakens protection against aggression.

DETAILED DESCRIPTION

The present invention makes it possible to remedy those drawbacks since the protection device can be lengthened or shortened at will in order to be fitted accurately to the portion of rail that is to be protected without any need to add or remove an element or to install a new device cut to the right size.

This device, of dimensions that can be varied at will, is a device that saves time since its modularity on demand can be used quickly on site. It can be reused as many times as desired by means of the installation and removal mechanisms that are described below.

Once adjusted to the desired dimension, the device guarantees that the portion of rail on which it is installed is protected against any aggression. The device may be preadjusted before being installed in the rail by using dimension information marked on one of its faces in order to guide the operator.

An advantage of the device is that its dimensions can be varied at will regardless of the length of the rail to be protected, and it is thus reusable as desired while conserving its integrity and its properties.

In order to provide effective protection for the portion of rail between two equipment anchor points, the device must be capable of being fitted accurately to the interval between those two points, which interval may be variable.

Another advantage of this device lies specifically in fitting it to the interval between two equipment anchor points, since the device can be extended as a function of the rail portion that is to be protected.

Another advantage of this device is that it can be fastened in the rail, whatever the location on the rail, and it becomes clamped so as to be held in place.

One more advantage of this device is that it can be preadjusted to a given length and can thus act as an abutment or as a measurement element for determining an interval for the purpose of fastening other pieces of equipment at desired intervals in the rail.

The device may be fastened in releasable or permanent manner and/or in hinged manner to pieces of equipment, and once its length has been adjusted, it may be positioned in the rail in order to act as an abutment for the following piece of equipment that is to be installed in the rail.

This optionally preadjusted device, when fastened in permanent manner to one of the pieces of equipment, may become locked in position on the rail by the piece of equipment that overlies it.

This preadjustment can make it possible, when the rail protection device is already in place in the rail and without it being limited by anchor points, for the rail protection device to be used as a template or an abutment for pieces of equipment that are to be fastened at desired intervals.

The device is designed in such a manner as to be held in the rail in complete safety.

The rail protection device may be made up of one or more elements that are connected to one another in such a manner as to be held captive and to ensure, regardless of the extent to which they are deployed, that the device is locked, possibly by self-locking in the rail, merely by deploying its elements, and it can perform all of the functions of protecting the rail against any type of aggression. At least one element, incorporating one or more elements that may for example be deployed in connection with one another, including at least one element that is in contact with the slot of the rail so as to become inserted, e.g. in the half-recesses of a rail, which may be of the airplane type, and be capable of being fastened by means of at least one anchor point at one or more locations of the rail portion to be protected.

The portion penetrating into the slot of the airplane type rail may be made up of one or more subassemblies suitable for matching the shape of the recesses of the rail and/or the internal slot of the rail.

One or more elements of the protection device may overlap and slide, by means of complementary grooves, so as to cover the apparent spaces of the rail in order to protect them from aggression.

These sliding elements may be graduated to provide information about the desired dimensions and to enable adjustment prior to being installed on the rail.

Under such circumstances, the protection device also acts as a template for the desired intervals.

These optionally-graduated slidable elements act on the system for clamping the protection device in the rail, and depending on the movement that is applied via pegs installed on the device.

In order to secure deployment of the slidable elements, an optionally removable locking system, possibly in a remote controlled system, that is situated at at least one end of the protection device, holds the device in place in the rail.

In a particular embodiment of the invention, the rail protection device is made up of:

two elements (A, B) that deploy in connection with each other, at least one element is in contact with the slot (r1) of the rail (R) so as to become inserted in the recesses (3, 3) of the rail (R) and so as to be capable of becoming fastened by means of at least one anchor point (4, 5, 6, 7) at one or more locations of the rail portion (R) that is to be protected.

The device is made up of a stationary element (A) and a movable element (B), that may remain connected together.

At one end of its bottom portion, the element (A) includes a peg (4) for inserting in the recess (3, 3) of the rail (R) and one or more parts (5) that become inserted in the interval (8) that extends between two recesses (3, 3').

The peg (4) has the shape of a recess. The part (5) has a rod (11) passing longitudinally therethrough and passing through the centers of two guides (12, 12).

The rod (11), which is capable of moving longitudinally through the guides (12, 12'), is provided at one end with a spring (15) situated between the part (5) and the peg (4). The function of the spring (15) consists in pushing away the part (5) that becomes inserted in the interval (8) in order to hold the stationary element (A) in the rail on the x-x' and y-y axes.

In order to release the element (A), it is necessary to move the rod (11) in translation in the direction opposite to the working direction of the spring (15), thereby having the effect of disengaging the part (5) inserted in the interval (8) and moving it towards the recess (3, 3') in which the part (4) is inserted, which part can thus be released.

The element (B) slides by means of a groove (2, 2) on each of its sides, the grooves receiving the splines (1, 1) situated on each of the sides of the element (A).

The element (B) is provided at one end with a stud (6) situated at a distance from the peg (7) such that this distance is equal to half the distance between two recesses (3, 3).

Figure 4:
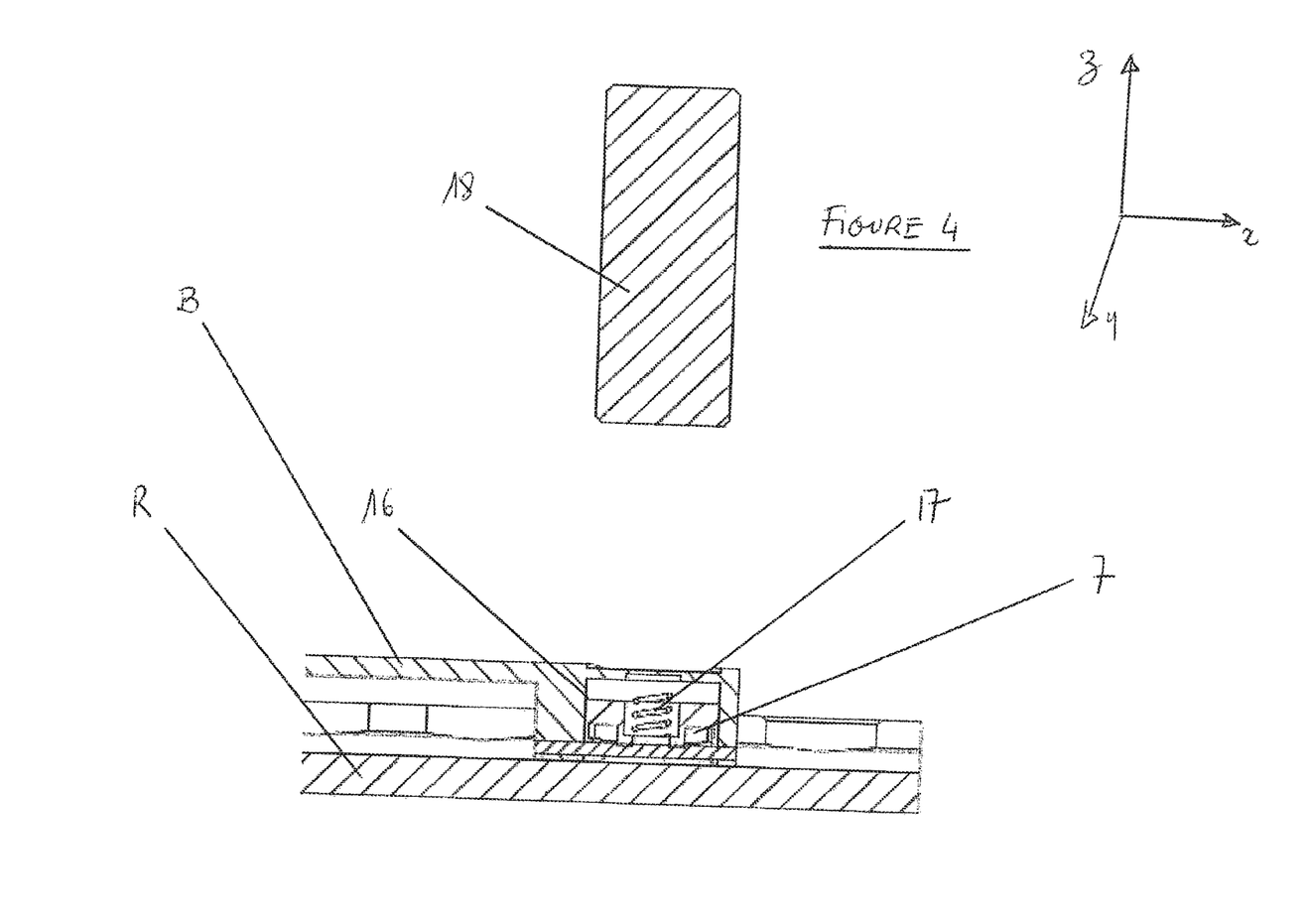
FIG. 4 is a section view of a peg (7), the well (16), the spring (17), and the magnet (18).

The peg (7) is retractable. The peg is made of material that can react to a magnet. The peg (7) is situated in a blind well (16) that does not open out into the top portion of the movable element (B).

The peg (7), held captive in the well (16), can move freely within the space of the well.

A spring (17) situated between the blind end of the well (16) and the top portion of the peg (7) exerts pressure continuously in order to move the peg (7) away from the blind end of the well (16).

Although it is held captive in the well (16), the peg (7) projects from the open end of the well (16) when it is subjected to the effect of pressure from the spring (17).

The peg (7) projecting from its housing has the effect of blocking the movable element (B) in any recess (3, 3).

In order to modify the position of the element (B), it is necessary to raise the peg (7) inside the well (16) in order to extract the peg (7) from the recess (3, 3) in order to be able to move in translation towards another recess, thereby enabling the peg (7) to be inserted into any recess (3, 3) and enabling the element (B) to be blocked in a different position.

In order to avoid any accidental or malicious manipulation, concerning changing the position of the element (B) or indeed removing the entire protection device from the rail, so as to make the device tamperproof and protect the element (B) against external aggression, movement in translation against the force of the spring (17) is performed by placing a magnet (18) of sufficient power to pass through a wall constituted by the blind end of the well (16) and counter the force of the spring (17) so as to raise the peg (7) against the blind end of the well.

The element (A) and the element (B) have smooth surfaces without any apparent possibility of disassembly such as a screw, a nut, or a slot for use by any tool. These characteristics constitute a guarantee against any malicious action, degradation, domestic accident, or dirt collection that might prevent operation.

The operating principle of the above-described mechanism involving a magnet (18) associated with the smooth surfaces of the elements (A, B) guarantees a very high level of protection against any type of aggression.

The presence of the magnet (18) makes it possible to move the movable element (B) of the rail protection device in translation.

Removal of the magnet (18) makes the rail protection device non-removable.

The rail (R) being covered by the rail protection device provides sealing by means of sealing gaskets (d1, d2, d3, d4) against the side edges of the elements (A, B).

The stud (6) co-operates continuously in making the rail protection device secure in connection with the peg (7) that, under the attraction of the magnet (18), compresses the spring (17), retracts into the well (16), and at this instant the stud (6) slides in the rail (R), constraining the rod (11) to move the part (5) towards a recess (3, 3) and enabling the device to be released from the rail.

In order to remove the rail protection device, the movement in translation of the element (B) performed by means of the magnet (18) enables the element (A) to be overlapped until it is completely covered. Under the effect of the magnet (18), the peg (7) becomes extracted from the recess (3, 3), the stud (6) comes into contact with the end of the rod (11) and moves the rod (11) in translation through half an inch, thereby compressing the spring (15), which moves the part (5) in translation, thereby enabling the rail protection device to be released completely.

For reasons of ease of use, the positions of the recesses covered by the rail protection device may be made apparent in any way, possibly by means of a graduation (19, 19', 19").

A graduation that is apparent on the element (B) informs the user with the magnet (18) so as to guide the user about the position of the well (16), which is not apparent on the top portion of the movable element (B).

Under such circumstances, the protection device also serves as a template for determining the desired intervals.

Figure 1:
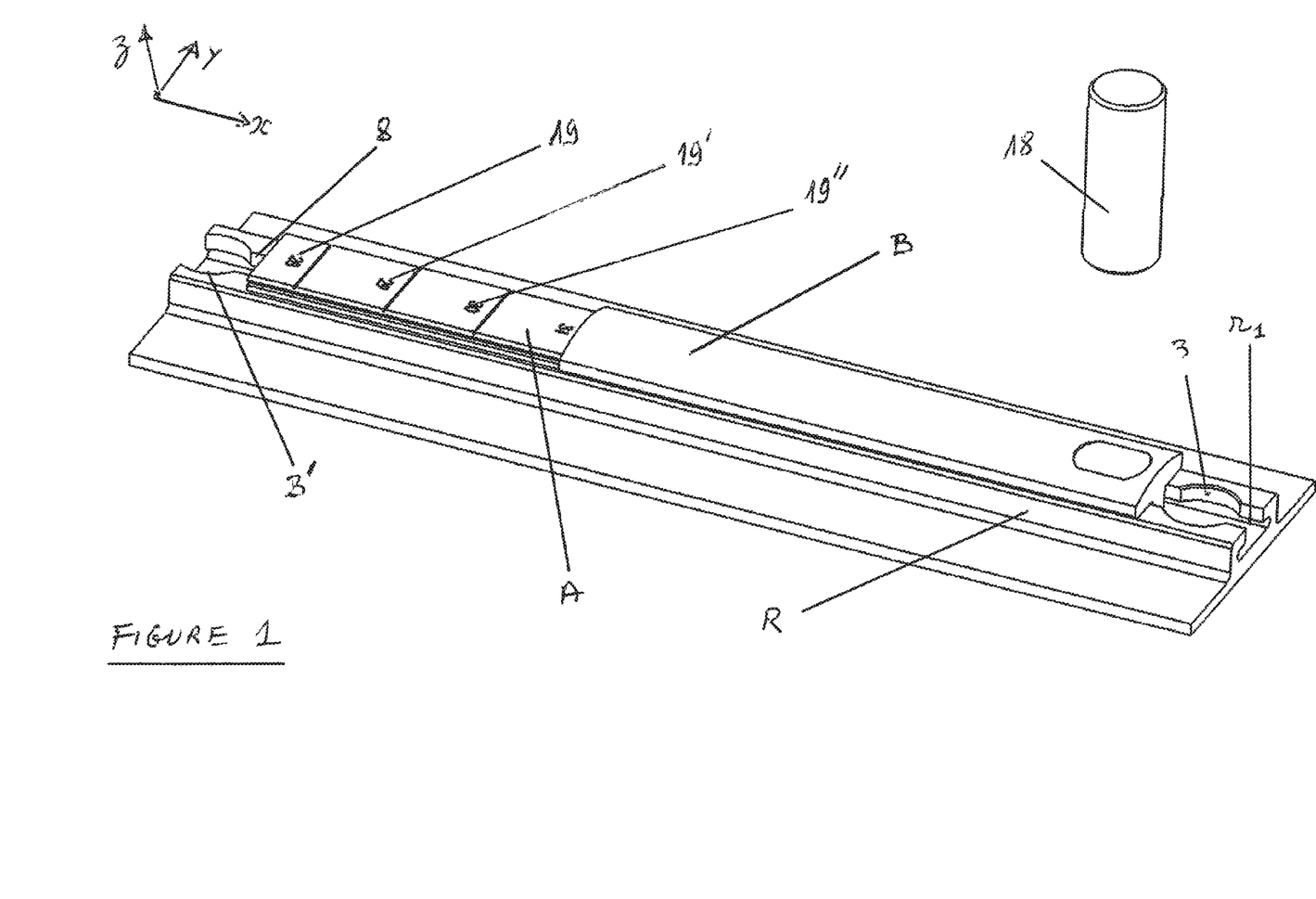
FIG. 1 shows the protection device when deployed; seen from above.

FIG. 1 shows the protection device when deployed; seen from above.

Figure 2:
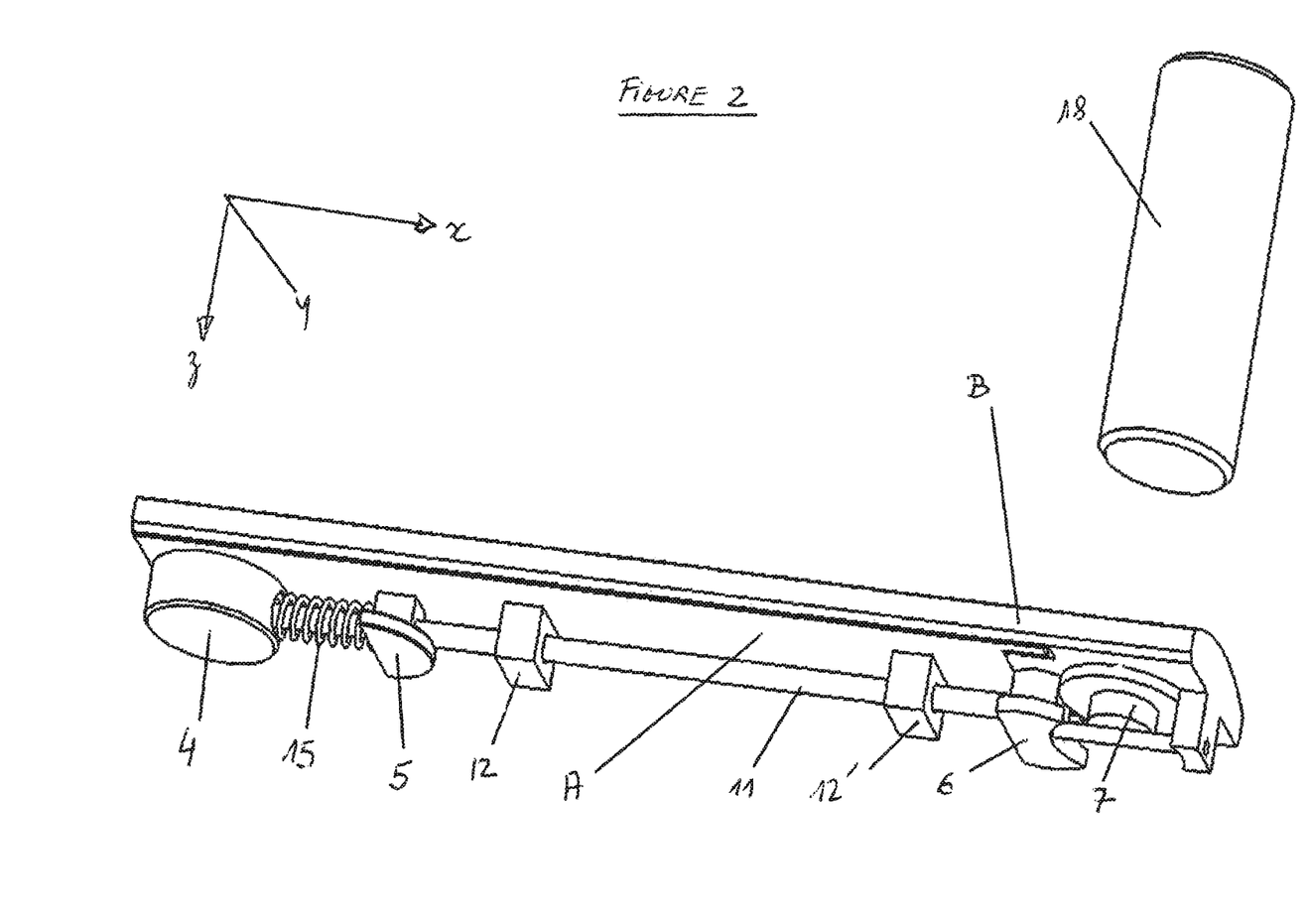
FIG. 2 shows the protection device when not deployed; seen from below.

FIG. 2 shows the protection device when not deployed; seen from below.

Figure 3:
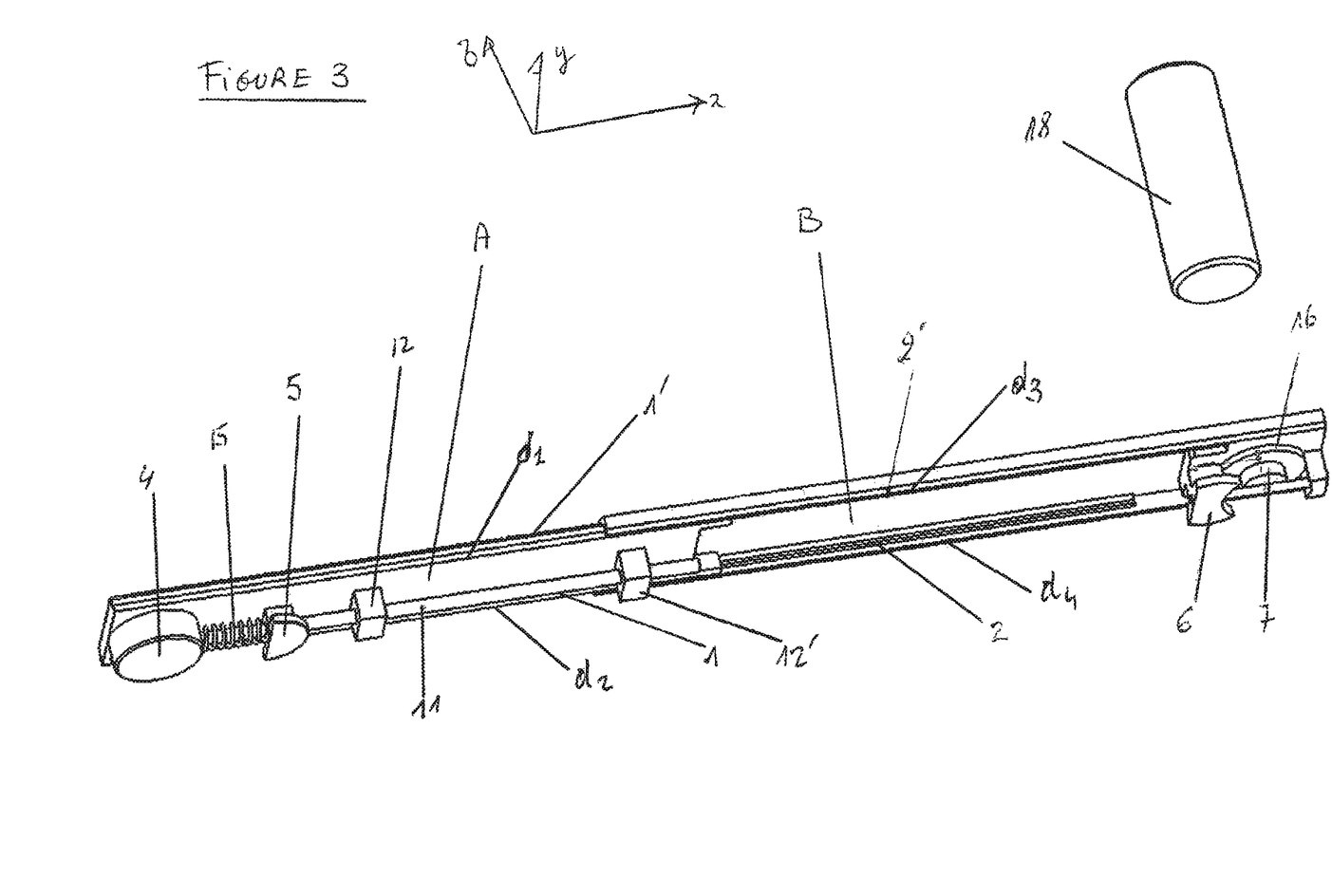
FIG. 3 shows the protection device when deployed; seen from below.

FIG. 3 shows the protection device when deployed; seen from below.

FIG. 4 is a section view of a peg (7), the well (16), the spring (17), and the magnet (18).

Figure 5:
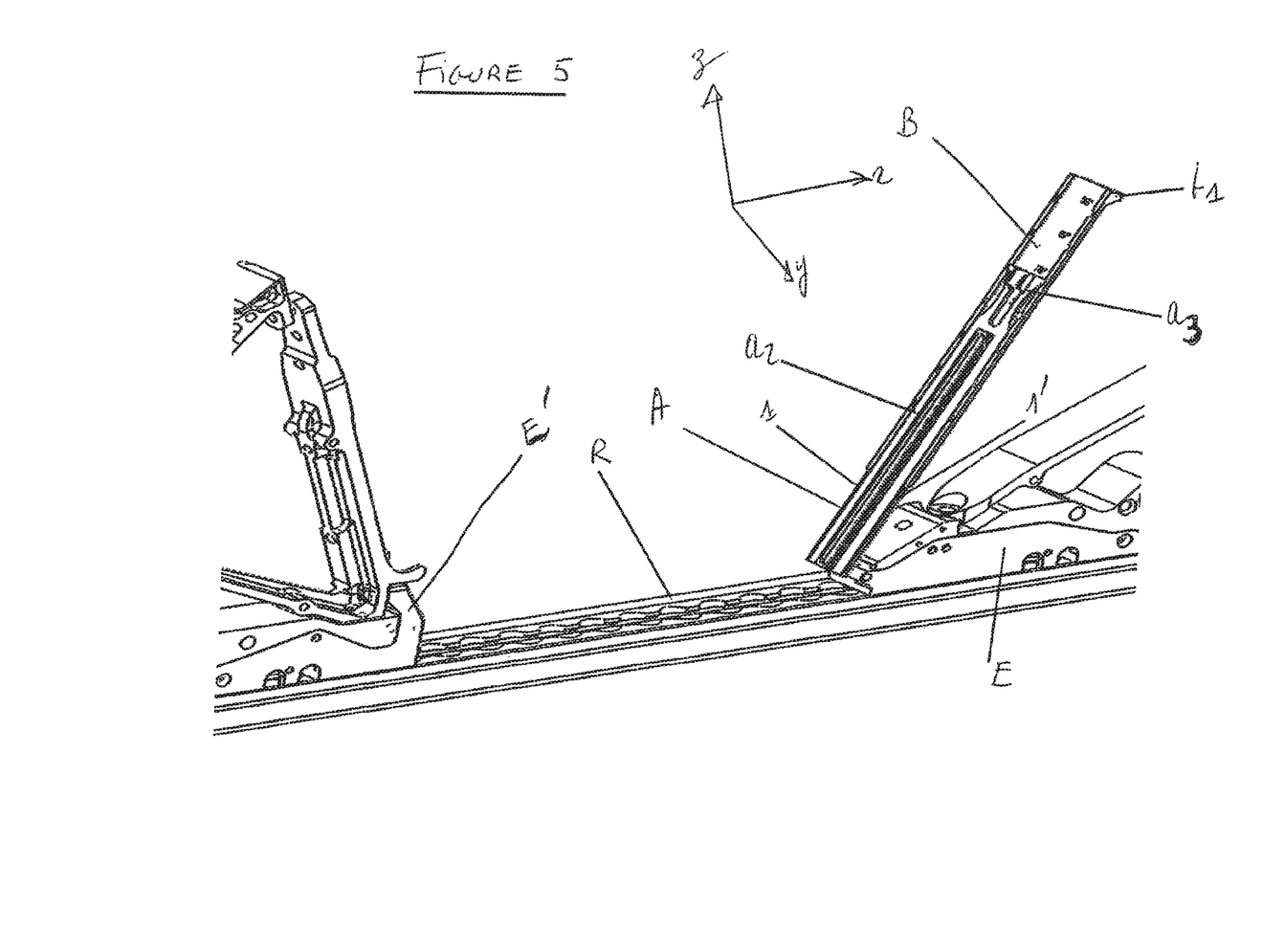
FIG. 5 shows the rail protection device hinged at one end by a hinge (a1) to a piece of equipment (E).
Figure 6:
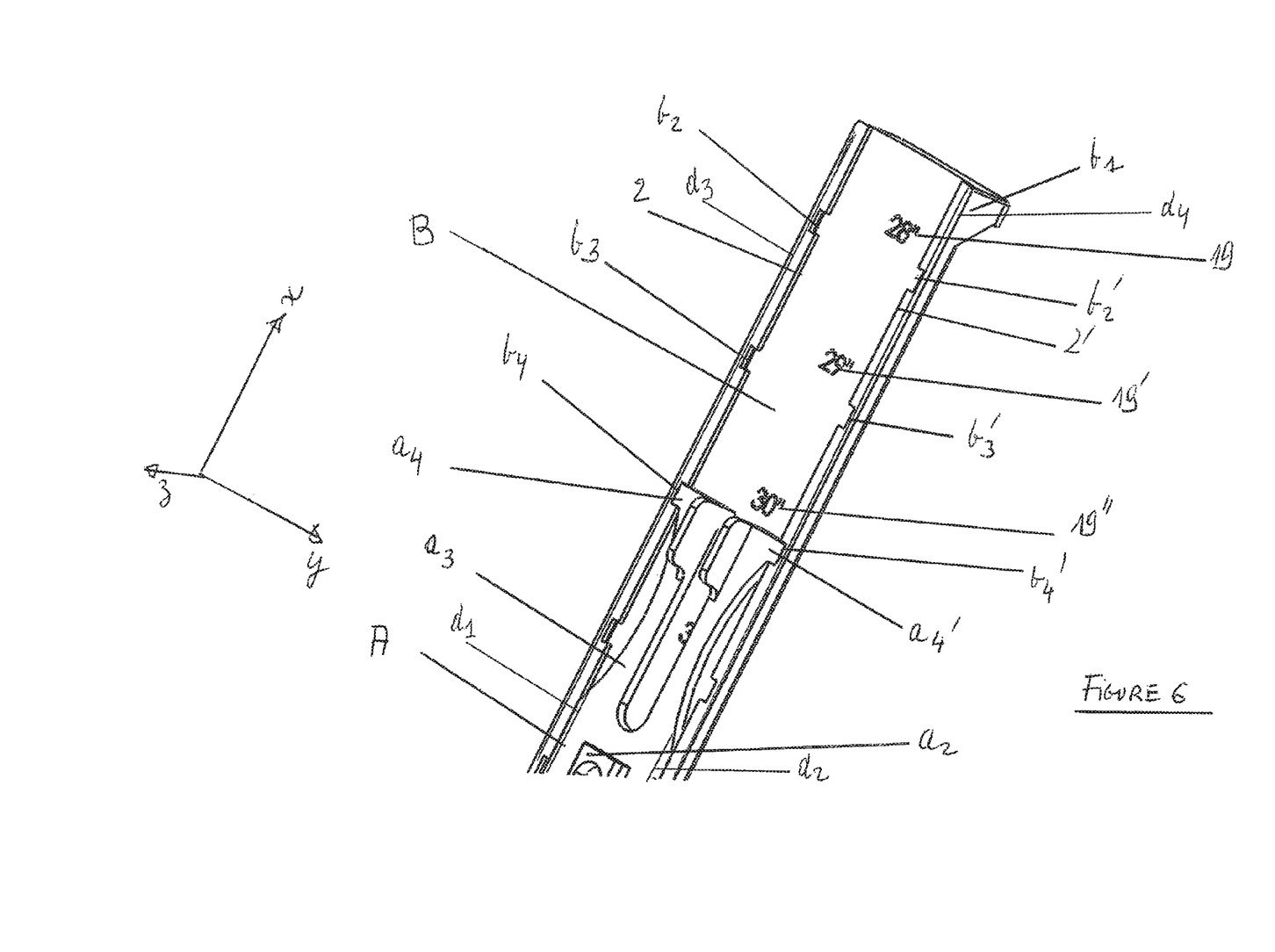
FIG. 6 is a detail view of the rail protection device.
Figure 7:
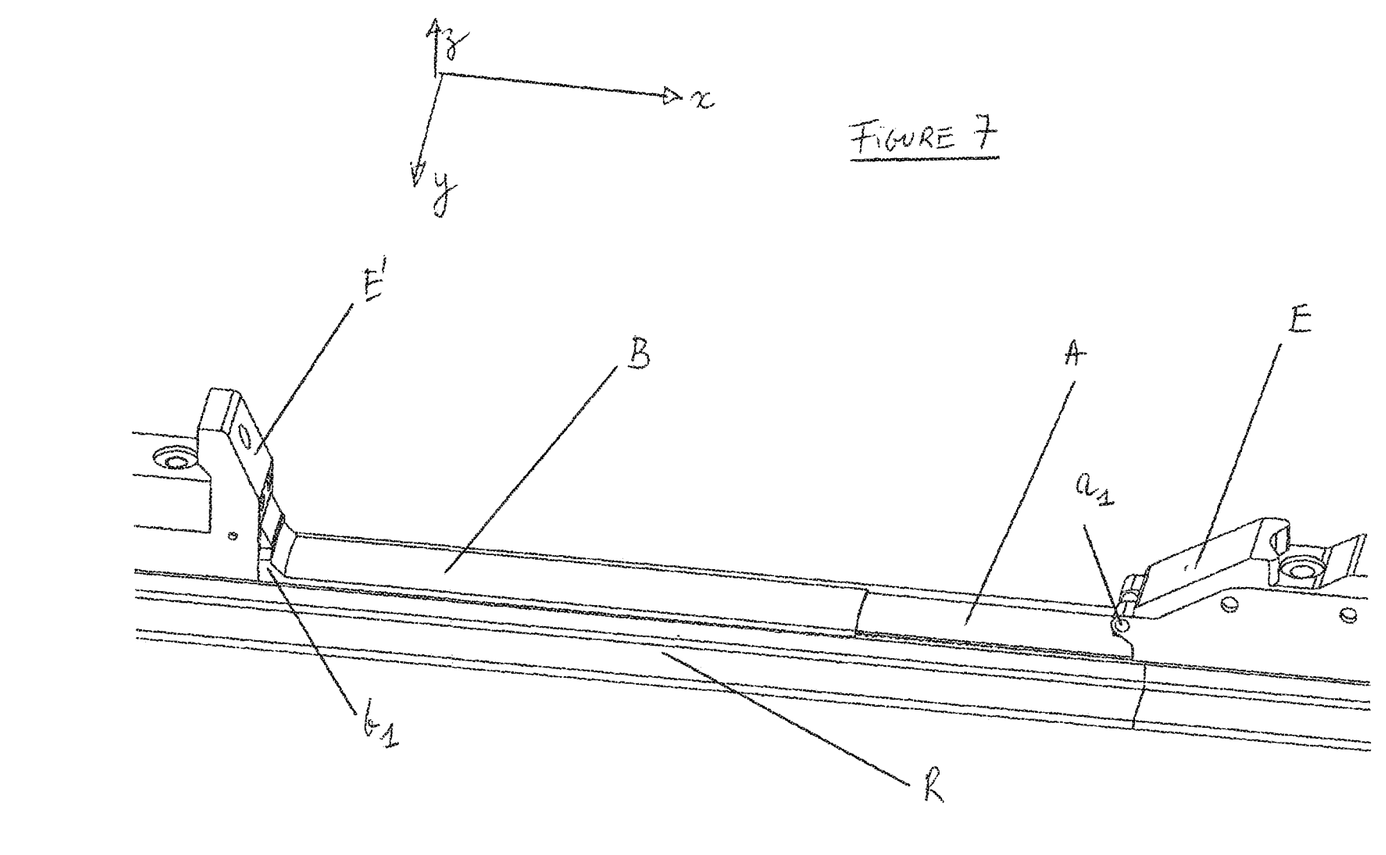
FIG. 7 shows the rail protection device covering the rail (R), being hinged at one of its ends to a piece of equipment (E) by a hinge (a1) and connected at its other end to another piece of equipment (E') by a stud (b1).

In another particular embodiment of the invention, the stationary element (A) is secured to a slidable element (B) that covers it in part, the stationary element (A) being inserted in lateral slideways ( ) of the slidable element (B). The stationary element (A) is connected to a piece of equipment (E) by means of a hinge (a1) situated at one of its ends. The slidable element (B) is provided at one of its ends with a stud (b1) that becomes blocked in the piece of equipment (E). The pieces of equipment (E, E) are locked in the airplane rail (R) using a fastener system that is specific thereto.

On its inside face, the stationary element (A) is provided with a centralizer (a2) that is inserted in the slot of the rail (R). The centralizer (a2) serves to hold the rail protection device in place on the axis y-y'.

At the other end of the stationary element (A), there is a shape memory fork (a3) operating on the y-y axis and provided with two lugs (a4-a4) that become inserted in graduated-position notches (b2-b2', b3-b3', b4-b4') that are situated on the inside face of the slidable element (B).

Each notch (b2-b2', b3-b3', b4-b4) corresponds to a graduation value (19, 19', 19").

The shape memory fork (a3) is provided with two lips (a5, a5) that, when they are clamped together, serve to.

In order to adjust the length of the rail protection device, it is necessary to begin by pivoting it about the hinge (a1) in order to have access to the shape memory fork (a3) and to the graduations (19, 19', 19").

When the rail protection device is in position in the rail (R) after adjusting the desired distance, it constitutes a positioning template for the piece of equipment (E').

In this particular embodiment, the rail protection device is always secured to the piece of equipment (E) and it becomes locked in the rail (R) when the stud (b1) becomes blocked in a piece of equipment (E').

The rail (R) being covered by the rail protection device provides sealing by means of a sealing gasket at the side edges of the elements (A, B).

In order to avoid any accidental or malicious manipulation for changing the position of the element (B), the position of this element is adjusted to the desired length as described above, prior to the elements (A, B) being pivoted in a circular arc about the hinge (a1) and pressed against the rail (R); this position being made secure by the element (E') that overlaps and locks the stud (b1). The rail protection device is thus held in position in the rail (R) by means of the pieces of equipment (E, E) fastened in the rail (R).

The element (A) and the element (B) constitute surfaces that are smooth without any visible possibility for disassembly, such as a screw, a nut, or a slot for engaging any tool. These characteristics constitute a guarantee against any malicious action, degradation, domestic accident, or dirt collection impeding operation.

A very high level of protection against any type of aggression is guaranteed by the above-described principle of operation of the mechanism, which involves preadjusting the position of the element (B) relative to the element (A), and maintaining them in a locked position on the rail (R), in association with the smooth surfaces of the elements (A, B).

FIG. 5 shows the rail protection device hinged at one end by a hinge (a1) to a piece of equipment (E). The rail protection device is in its position for adjusting the distance between a piece of equipment (E) and a piece of equipment (E').

FIG. 6 is a detail view of the rail protection device.

FIG. 7 shows the rail protection device covering the rail (R), being hinged at one of its ends to a piece of equipment (E) by a hinge (a1) and connected at its other end to another piece of equipment (E') by a stud (b1).

The invention claimed is:

1. An aircraft anchoring rail protection device for covering and preventing access to unused portions of the rail, in which the anchoring rail has a slot for receiving and anchoring equipment to the rail, said protection device being intended for being attached to the rail and covering an unused portion thereof, said protection device comprising at least a first element and a second element slidably secured to said first element, said first and second elements having graduation markings to provide information about the length of said elements and to enable preadjustment of the length of said elements prior to being attached to the rail, said first and second elements being configured to slide relative to each other between different graduated positions at a predetermined distance from each other, each graduated position being a blocking position so that the protection device forms an abutment for pieces of equipment that are to be fastened to the rail at desired intervals.

2. A rail protection device as defined in claim 1 in which the anchoring rail has a plurality of recesses with respective predetermined intervals therebetween, said first element including a peg for inserting in one of said recesses.

3. A rail protection device as defined in claim 2 in which a shape of said peg corresponds to a shape of said one of said recesses.

4. A rail protection device as defined in claim 2 wherein said first element includes a part and a rod capable of moving longitudinally and provided at one end with a spring for pushing away said part so as to insert it in one of said recesses in order to hold the first element in the rail, the rod being capable of being moved in translation in a direction opposite to a working direction of the spring, thereby having the effect of disengaging said part inserted in the one of said recesses.

5. A rail protection device as defined in claim 1 wherein said second element includes a retractable peg made of material that can react to a magnet, the peg being capable to be in a deployed position enabling the peg to be inserted in a recess of the rail for blocking said second element, said peg being capable of being disengaged from said deployed position by submitting said peg to the effect of a magnet.

6. A rail protection device as defined in claim 4 wherein said second element is provided with a stud capable of constraining the rod when the first and second elements slides towards a relative position in which they overlap each other, thereby enabling the rail protection device to be released.

7. A rail protection device as defined in claim 1 in which said anchoring rail has recesses with respective predetermined intervals therebetween, said graduation markings being intended to indicate positions of said recesses.

8. A rail protection device as defined in claim 5 in which the second element has an apparent graduation to inform a user about the position of the retractable peg.

9. A rail protection device as defined in claim 1 wherein said device includes a hinge for connecting the device to a piece of equipment.

10. A rail protection device as defined in claim 1 wherein the first element is provided on its inside face with a centralizer intended to be inserted in the slot of the rail.

11. A rail protection device as defined in claim 1 wherein the first element includes a shape memory fork provided with two lugs inserted in graduated-position notches that are situated on the inside face of the second element, each notch corresponding to a graduation value, said lugs being movable towards each other so as to disengage them from the notches and release the second element relative to the first element so as to make it possible to slide it and take it to a desired graduation value and then insert the lugs in the corresponding notches, thereby fitting the length of the protection device to the distance of the rail to be protected.

12. A rail protection device as defined in claim 1 wherein said device includes a sealing gasket at respective side edges of the first and second elements.

13. A rail protection device as defined in claim 1 wherein said graduation markings are provided on an inner face of the device.

14. A method for covering and preventing access to unused portions of an aircraft anchoring rail, in which the anchoring rail has a slot for receiving and anchoring equipment to the rail, said method including:

providing a protection device comprising at least a first element and a second element slidably secured to said first element, said first and second elements having graduation markings to provide information about the length of said elements, said first and second elements being configured to slide relative to each other between different graduated positions at a predetermined distance from each other, each graduated position being a blocking position so that the protection device forms an abutment for pieces of equipment that are to be fastened to the rail at desired intervals;

attaching said protection device to the rail to cover an unused portion thereof; and prior to attaching the device to the rail, preadjusting the length of said first and second elements by using said graduation markings.

\* \* \* \* \*